United States Patent [19]

Kemmler et al.

[11] 4,341,738

[45] Jul. 27, 1982

[54] DECOMPOSITION AND OXIDATION SYSTEM

[75] Inventors: Gerhard Kemmler, Karlsruhe; Herbert Wieczorek, Weingarten; Jürgen Plessing, Stutensee, all of Fed. Rep. of Germany

[73] Assignee: Kernforschungszentrum Karlsruhe Gesellschaft mit beschränkter Haftung, Karlsruhe, Fed. Rep. of German

[21] Appl. No.: 197,703

[22] Filed: Oct. 16, 1980

[30] Foreign Application Priority Data

May 8, 1980 [DE] Fed. Rep. of Germany ....... 3017547

[51] Int. Cl.³ .............................................. B01J 19/24
[52] U.S. Cl. .................................. 422/184; 422/159; 422/199; 422/224
[58] Field of Search ............... 422/132, 159, 184, 198, 422/199, 230, 231, 232, 224; 241/3 E

[56] References Cited

U.S. PATENT DOCUMENTS

| | | | |
|---|---|---|---|
| 3,108,060 | 10/1963 | Matthews | 422/198 X |
| 3,352,645 | 11/1967 | Faugeras et al. | 422/230 X |
| 3,499,947 | 3/1970 | Johnson | 422/199 X |
| 3,738,815 | 6/1973 | Pawloski et al. | 422/132 |
| 3,794,470 | 2/1974 | Meyer et al. | 422/230 X |
| 3,880,921 | 4/1975 | Hellemanns et al. | 422/231 X |
| 3,957,676 | 5/1976 | Cooley et al. | 423/20 X |
| 4,230,672 | 10/1980 | Divins et al. | 422/159 |

FOREIGN PATENT DOCUMENTS

1330527 9/1973 United Kingdom .

OTHER PUBLICATIONS

*Acid Digestion of Combustible Waste,* Hanford Eng. Development Lab., Allen et al., Oct. 1978.

*Primary Examiner*—William A. Cuchlinski, Jr.
*Attorney, Agent, or Firm*—Spencer & Kaye

[57] ABSTRACT

An apparatus for decomposing difficultly soluble substances and oxidizing organic wastes which contain difficultly soluble substances, in which the substances and/or wastes are reacted with at least one hot acid, and from apparatus which heat losses are compensated. The apparatus comprises a ring-shaped reaction vessel including at least one horizontally extending region and at least one vertically extending region. A feeder is connected to the vertically extending region for the addition to the reaction vessel of substances and/or wastes, acid, and gas. A degasificaton zone is connected to the horizontally extending region.

14 Claims, 1 Drawing Figure

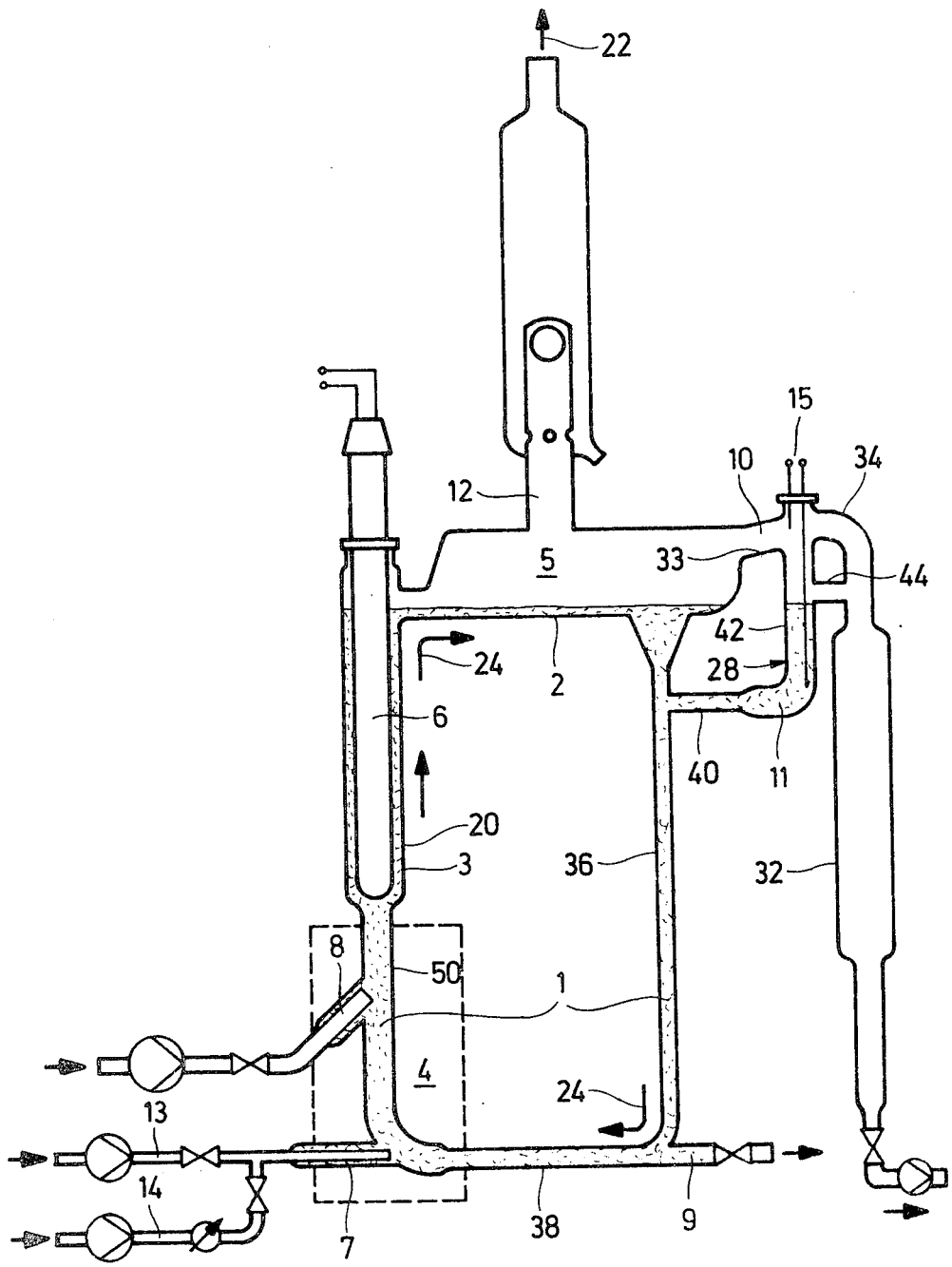

DECOMPOSITION AND OXIDATION SYSTEM

BACKGROUND OF THE INVENTION

The present invention relates to an apparatus for decomposing difficultly soluble substances and/or for the oxidation of organic wastes containing such difficultly soluble substances, in which the substances, in the form of a paste or viscous material, and with or without the wastes, are brought into contact with at least one hot acid and from which heat losses are compensated. This apparatus can be used particularly for decomposing $PuO_2$ or for the decomposition and oxidation of combustible wastes containing plutonium.

Such wastes are composed mainly of PVC, polyethylene, neoprene and cellulose. Nuclear facilities generate large quantities of such wastes, and the plutonium content in such large quantities are not insignificant. For example, in one planned nuclear facility there will be produced, inter alia, about 1000 m$^3$ annually of such wastes with a total content of 120 kg plutonium. A series of treatment methods have been developed, among which are wet combustion processes such as described in British Pat. No. 1,330,527, and U.S. Pat. No. 3,957,676, and copending U.S. Pat. application Ser. No. 141,700, assigned to the same assignee as the present application, for the purposes of volume reduction of the wastes.

One such wet combustion method is based on the chemical digestion of the wastes by means of concentrated sulfuric acid and nitric acid at a temperature of 250° C. according to the following general reaction:

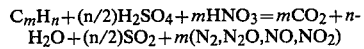

$$C_mH_n + (n/2)H_2SO_4 + mHNO_3 = mCO_2 + n\text{-}H_2O + (n/2)SO_2 + m(N_2,N_2O,NO,NO_2)$$

The sulfuric acid carbonizes the wastes while the nitric acid oxidizes this carbonization product to carbon dioxide. The waste gas leaving the reactor also contains the acid gases NO, $SO_2$ and possibly HCL which are processed into acids, separated and, in the case of $HNO_3$ and $H_2SO_4$, are returned to the process. An inorganic residue forms from the fillers in the wastes and the plutonium accumulates in this residue. Due to the slight difference in density and the continuous movement of the acid in the reactor, this residue remains suspended.

In the wet combustion process, difficultly soluble plutonium oxide is converted, after a suitable period of dwell, into relatively easily soluble plutonium sulfate. This chemical conversion constitutes an important step in the separation of plutonium.

A drawback of the prior art wet combustion methods, is the insufficient circulation of the plutonium oxide or the entire solid material in the reaction acid. A disclosure of one such system in which a wet combustion process is carried out is made in C. Allen et al., HDL-TME 78-77, Hanford Engineering Development Laboratory, October 1978, where a so-called tray reactor is used. The reactor includes two units, an acid heater and an oxidation furnace (digester tray vessel). Between the two units, a mammoth pump circulates the reaction acid. In the acid heater, the reaction acid ($H_2SO_4$) is heated to a temperature of 250° C., and this hot acid is brought into contact with the waste and the nitric acid on a tray of the oxidation furnace, causing the waste to oxidize. Gaseous products are formed by this reaction, and a residue remains which contains the plutonium. Instead of adding the nitric acid to the tray of the oxidation furnace and then adding the $H_2SO_4$ from the acid heater, the nitric acid can be added at the bottom of the acid heater and then both the nitric acid and $H_2SO_4$ are added to the tray.

In this type of reactor the heavy components of the residue preferably are deposited on the tray of the oxidation furnace and at the bottom of the acid heater. Increasing the temperature is not feasible because of the materials used, for example, for the mammoth pump. These materials also limit the service life of the system.

SUMMARY OF THE INVENTION

It is an object of the present invention to provide an apparatus for the decomposition of difficultly soluble substances alone, or for the decomposition of such difficultly soluble substances and the oxidation of organic wastes and other combustible materials which contain the difficultly soluble substances.

It is another object of the present invention to provide an apparatus in which the difficultly soluble substances are not deposited in the apparatus during operation.

It is a further object of the present invention to provide an apparatus which does not require mechanical circulating means and/or turbulence elements.

To achieve these objects and in accordance with its purpose, the present invention provides an apparatus for decomposing difficultly soluble substances, or for oxidizing organic wastes containing difficultly soluble substances, and decomposing the difficultly soluble substances contained therein, in which apparatus the substances and/or wastes are reacted, with at least one hot acid, and from which apparatus heat losses are compensated. This apparatus comprises a ring-shaped reaction vessel having at least one horizontally extending region and at least one vertically extending region. A feeder means is connected to the vertically extending region to allow the introduction of substances and/or organic wastes, acid and gas to the apparatus. A degasification means is connected to the horizontally extending region.

The apparatus of the present invention is particularly advantageous in that it is based on the design of a forced circulation evaporator (thermal syphon evaporator) with gas/air, so that the materials present in the reaction vessel can be circulated without the use of a mechanical device. This circulation is accomplished by changing, that is, by reducing the density of the liquid in a vertical reactor section by various means in order to create an updrift of liquid through the section in the direction of desired circulation. Thus, where a heating element is present in the apparatus, the density can be reduced by bubble formation in the reactor liquid at the surface of the heating element, and where the difficultly soluble substances are decomposed alone, circulation is accomplished simply by heating the liquid in the reactor to reduce its density. A higher circulation rate of the liquid may be achieved in the case of difficultly soluble substances by addition of air/gas. Circulation of liquid can be considerably increased when the above heating effects are combined with bubble formation which arises out of the substantially instantaneously evaporation of $HNO_3$. This occurs when cold 65% by weight nitric acid (Bp=120° C.) enters the reactor which contains concentrated sulfuric acid at 250° C., resulting in the immediate change of the nitric acid to a gas. The bubble formation, and hence liquid circulation in the apparatus, can also be increased by feeding gas or air into the reaction vessel and by feeding organic waste into the reaction vessel with bubble formation resulting from the oxidation of the organic waste.

It is to be understood that both the foregoing general description and the following detailed description are examplary, but are not restrictive of the invention.

BRIEF DESCRIPTION OF THE DRAWING

The accompanying drawing, in which like numbers indicate like parts, illustrates examples of presently preferred embodiments of the invention and, together with the description, serve to explain the principles of the invention.

The sole drawing FIGURE is a schematic representation of an apparatus according to the present invention.

DESCRIPTION OF THE PREFERRED EMBODIMENTS

The present invention will now be explained with the aid of the drawing FIGURE.

A reactor vessel is shown in the FIGURE in the form of a ring reactor 1 comprised of a vertical region 3, a generally opposing vertical region 36, an upper horizontal region 2 connecting vertical region 1 with vertical region 2 at their top, and a lower horizontal region 38 connecting vertical regions 3 and 36 at their bottom. Each of the regions 2, 3, 36, and 38 form an arm of ring reactor 1. Vertical region 3 includes a feeder zone 4 at its lower portion and a heating zone 20 at its top. Ring reactor 1 is in the form of a closed circuit formed by a series of pipes having diameters which vary between 40 and 150 mm. The length of each region of reactor 1 is about 1 m. Suitable materials for reactor construction are glass and tantalum.

Horizontal region 2 is the upper horizontal arm of reactor 1 and includes a degasification zone 5 which is widened to a pipe of a diameter of 150 mm. The liquid level in the degasification zone 5 is about 30 mm and is controlled by overflow. Degasification zone 5 is provided with an exhaust gas line 12 through which the exhaust gas can be extracted, in the direction of arrow 22, from the mixture being circulated in ring reactor 1.

In vertical region 3, heating zone 20 is provided with a quartz heating element 6 which is 60 mm in diameter and 550 mm in length. Heating element 6 can be in the form of a vertically extending rod which forms an annular chamber with the outside wall of heating zone 20. The space between heating element 6 and outside wall amounts to 15 mm. Heating zone 20 is above feed zone 4 and downstream of feed zone 4 when viewed in the direction of flow which is indicated by arrows 24. Feed zone 4 is in the form of a vertical pipe 50.

Feed zone 4, shown generally within the dashed lines, includes a feeder pipe 7 (15 mm in diameter) and a feeder pipe 8 (25 mm in diameter). Through feed zone 4, ring reactor 1 receives substances to be decomposed in feed zone 4, which substances enter feed zone 4 through feeder pipe 8. Thus, through feeder pipe 8, a suspension of a difficultly soluble substance, such as $PuO_2$ in $H_2SO_4$ at room temperature can be supplied to ring reactor 1. The difficultly soluble substances can also be supplied together with organic wastes and acid in the form of a paste or viscous substance through feeder pipe 8. Further, it is possible, at the same time, to also supply to ring reactor 1, through feeder pipe 7, other acids, such as 65% $HNO_3$ and gases or air. Feeder pipe 7 contains a supply line 13 for these other acids and a supply line 14 for the gases or air.

Feed zone 4, when viewed in the direction of circulation, lies upstream of heating zone 20. Heating zone 20 may serve to make up heat losses in the mixture or in ring reactor 1, and to assist the circulation by bubble formation at the surface of quartz heating element 6. Heating zone 20 may be eliminated if the supply of gases and/or acids added through feeder pipe 7 produces sufficient driving energy to circulate the mixture and the temperature (heat content) of the incoming substances, wastes, gases and/or acids is increased sufficiently to simultaneously compensate for heat losses. In such a case, an external heating means may additionally be provided. If heating zone 20 is eliminated, vertical region 3 then will comprise a feed zone 4 at its bottom and an upper zone which has the same diameter as feed zone 4.

Heat losses can also be compensated by heat generated by the combustion of organic waste of the paste or viscous substances supplied through feeder pipe 8. The gas produced during the combustion of the organic wastes then also contributes to the energy required for circulating the mixture. Feeder pipe 8 for the paste or viscous substances when viewed in the direction of circulation, lies downstream of feeder pipe 7 when viewed in the direction of circulation since, for example, if there are no organic wastes and thus no gas formation to contribute to the circulation, the updrift and carrying along of the difficultly soluble substances must be effected by the gases and/or acids entering through feeder pipe 7.

The circulation rate can be varied by means of the temperature of heating element 6 (energy) and hence of the $H_2SO_4$ which is located in the apparatus and the feed rate of the individual added substances, gases or acids.

For example in an apparatus of the size described above which contains about 10 l $H_2SO_4$, the circulation rate of the acid is over 1 cm/s at temperature of 200° C. or less and without addition of any substances, gases or acids. When under similar conditions the acid temperature in the apparatus amounts to 250° C. the circulation rate rises to 5 cm/s. Otherwise the acid circulation rate increased to about 100 cm/s when in the apparatus in which the acid is heated up to 250° C. per hour about 0.5 $Nm^3$ gas or 2.3 l $HNO_3$ (65%) and 1.5 kg organic material in form of a paste is added.

For the oxidation of organic materials and for decomposing of difficultly soluble substances the apparatus is filled to operation liquid level of the degasification zone 5 with concentrated $H_2SO_4$ and heated up to a temperature of 250° C. When the operation temperature is reached the organic material in form of a paste with $H_2SO_4$ and/or the difficultly soluble substances in form of a paste with $H_2SO_4$ or dry is added onto the apparatus using feeder pipe 8. Simultaneously $HNO_3$ and/or air and/or gases is added using pipe 7.

Ring reactor 1 is additionally equipped with a discharge 9 at the lowest part of the system as an off-branch of horizontal region 38 where it meets with vertical region 36 (regions 36 and 38 should be of equal diameter of 40 mm because of the uniform flow of the liquid), and two overflow means, a safety overflow 10, and an operating overflow 11. Operating overflow 11 comprises L-shaped structure 28 having a horizontal pipe 40 connected to the upper middle portion of vertical region 36 of ring reactor 1, a vertical pipe 42 extending upwardly from pipe 40, and a horizontal pipe 44 connected to vertical pipe 42 and positioned above the lowest point of horizontal region 2. Pipe 44 is connected to a vertical discharge pipe 32. Liquid rises in structure 28 to a point equivalent to its level in horizontal region 2 of ring reactor 1. Should the liquid rise in structure 28 to the level of pipe 44, pipe 44 carries the excess liquid to discharge pipe 32.

Safety overflow 10 comprises a pipe 33 connecting the upper part of the end portion of horizontal region 2 to the upper part of vertical pipe 42 of structure 28 and a pipe 34 connecting the upper part of vertical pipe 42 to discharge pipe 32. In the event of an overflow of liquid beyond the capacity of pipe 44, the liquid will rise to the level of pipe 33 and will flow through pipes 33 and 34 to reach discharge pipe 32.

The level of liquid in structure 28 can be measured by level detection means 15, which operates by the bubbling method and which comprises two thin tubes inserted into the top of pipe 42 of structure 28. This method can be based on the measurement of the pressure difference between the lowest point of the long tube of device 15 and the upper point of the short tube of device 15.

The supplying of the individual components of the mixture by means of valves and pumps can be realized in the conventional manner.

The following examples are given by way of illustration to further explain the principles of the invention. These examples are merely illustrative and are not to be understood as limiting the scope and underlying principles of the invention in any way. All percentages referred to herein are by weight unless otherwise indicated

EXAMPLE 1

A mixture of 50% PVC (polyvinylchloride), 20% neoprene rubber, 15% polyethylene and 15% cellulose, comminuted to a particle size of a maximum of 2 mm, was stirred into cold 85% by weight sulfuric acid to form a slurry containing 25% by weight waste.

A ring reactor 1, as shown in the drawing FIGURE, and connected to a waste gas purification system and to conduits for waste slurries, air and nitric acid, was filled with 10 liters of cold 85% by weight sulfuric acid and heated to 250° C. by means of a 5 kW quartz rod heating element 6.

By means of a viscous material or dosaging pump, waste slurries and 65% by weight nitric acid were fed simultaneously into the above described operational ring reactor 1. At the points of entry 8 and 7 of the waste and nitric acid, respectively, there occured heavy bubble formation which kept in motion all of the reactor acid and the waste or residue suspended therein.

After an hour's operation, 1 kg of the above-described waste mixture and 4.4 liters 65% nitric acid had been added and the waste had been completely oxidized. This caused 120 g residue, having a density of 2 g/cm$^3$, to be formed and this residue was kept suspended and floating during the operation of the reactor.

EXAMPLE 2

To simulate the precipitation behavior of plutonium oxide particles from nuclear fuel production which have a density of 11.4 g/cm$^3$, tantalum oxide (density=8.5 g/cm$^3$) of comparable particle size was added to the waste mixture described in Example 1 in a proportion of 20 g tantalum oxide per 1 kg waste. 80% of the bulk material of tantalum oxide had a grain size between 2 and 35$\mu$ and is similar to particle size of plutonium oxide. The waste thus prepared was oxidized in the manner described above in Example 1. After 4 hours of operation during which 4 kg waste together with 80 g tantalum oxide and 18 liters 65wt% nitric acid was added to the reactor, the waste was completely oxidized. As long as waste and nitric acid were added, no tantalum oxide and no residue precipitated.

EXAMPLE 3

In an operational reaction vessel in which 4 kg of a waste mixture with 80 g tantalum oxide had already been oxidized, further waste was added at a rate of addition of 1 kg/hour, and the rate of addition of 65% nitric acid was reduced from 4.4 l/h to 1 l/h. After 2 hours of such operation no precipitation of solids was observed.

EXAMPLE 4

In a procedure similar to the one described in Example 3, air was added instead of nitric acid at a dosaging rate of 0.4 m$^3$/h.

After 2 hours of such operation, no precipitation of solids was observed.

EXAMPLE 5

After the oxidation of 4 kg waste with 80 g tantalum oxide which together produced 560 g solids, the heating element 6 was switched off and no more nitric acid, air or waste was added. After 12 hours the acid in the reactor had cooled to room temperature and the solids had precipitated. The acid was then heated to a temperature of 60° C. and simultaneously air was added at a rate of 0.5 m$^3$/h. After 30 minutes of such operation all of the solids were homogeneously distributed in the acid.

It will be understood that the above description of the present invention is susceptible to various modifications, changes and adaptations, and the same are intended to be comprehended within the meaning and range of equivalents of the appended claims.

What is claimed is:

1. An apparatus for decomposing difficultly soluble substances, or for oxidizing organic wastes containing difficultly soluble substances and decomposing the difficultly soluble substances contained therein, in which apparatus the substances and/or wastes are reacted with at least one hot acid, and from which apparatus, heat losses are compensated, comprising:
    (a) a ring-shaped reaction vessel containing said hot acid and including at least one horizontally extending region and at least one vertically extending region;
    (b) a feeder means connected to said vertically extending region for adding to said reaction vessel the substances and/or wastes, further acid, and gas;
    (c) degasification means conducted to said horizontally extending region; and
    (d) driving means to cause the circulation of materials present in said reaction vessel in the form of a reaction gas produced during the introduction of at least one of the substances, the wastes, and the further acid.

2. Apparatus as defined in claim 1 wherein said feeder means comprises means for adding materials in the form of a paste or viscous substance.

3. Apparatus as defined in claim 1 wherein said feeder means comprises means for adding the substances and/or wastes in the form of a paste or viscous substance.

4. Apparatus as defined in claim 1, additionally comprising direct heating means in said reaction vessel to compensate for heat losses.

5. Apparatus as defined in claim 4 wherein said heating means comprises a heating element located downstream of the feeder means when viewed in the direction of circulation of materials present in said reaction vessel.

6. Apparatus as defined in claim 1, wherein the heat content of at least one of the further acid, the substances, the wastes, and the gas is used to compensate for heat losses.

7. Apparatus as defined in claim 1, wherein the materials present in said reaction vessel are circulated through said reaction vessel at a speed which is determined by varying at least one of the temperature, the rate of addition or the heating capacity of the materials added to the reaction vessel through said feeder means.

8. Apparatus as defined in claim 1 or 2 wherein the feeder means comprises a first feeder means for the further acid and gas and a second feeder means for the substances and/or wastes, the first feeder means being provided upstream of said second feeder means when viewed in the direction of circulation of materials present in said reaction vessel.

9. Apparatus as defined in claim 8 wherein said second feeder means comprises means for adding the substances and/or wastes in the form of a paste or viscous substance.

10. Apparatus as defined in claim 8, wherein the heating means comprises a heating element located downstream of the feeder when viewed in the direction of circulation of materials present in said reaction vessel.

11. Apparatus as defined in claim 1 additionally comprising a discharge means connected to the reaction vessel and overflow means connected to the reaction vessel.

12. Apparatus as defined in claim 11 wherein said overflow means comprises a safety overflow.

13. Apparatus as defined in claim 11 wherein said overflow means comprises an operating overflow means.

14. Apparatus as defined in claim 1, wherein the driving means comprises a heating means, located at said vertically extending region, for bubble formation at the surface of the heating means.

* * * * *